US012627338B2

(12) United States Patent  
Ait Aoudia et al.

(10) Patent No.: US 12,627,338 B2  
(45) Date of Patent: May 12, 2026

(54) TRANSMITTER

(71) Applicant: NOKIA TECHNOLOGIES OY, Espoo (FI)

(72) Inventors: Faycal Ait Aoudia, Saint-Cloud (FR); Jakob Hoydis, Paris (FR); Stefan Wesemann, Kornwestheim (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 232 days.

(21) Appl. No.: 17/964,679

(22) Filed: Oct. 12, 2022

(65) Prior Publication Data

US 2024/0146362 A1 May 2, 2024

(51) Int. Cl.  
*H04B 7/04* (2017.01)  
*H04B 7/0456* (2017.01)  
*H04B 7/06* (2006.01)

(52) U.S. Cl.  
CPC ......... *H04B 7/0456* (2013.01); *H04B 7/0615* (2013.01)

(58) Field of Classification Search  
CPC ............................ H04B 7/0456; H04B 7/0615  
USPC ........................................................ 375/262  
See application file for complete search history.

(56) References Cited

U.S. PATENT DOCUMENTS 10,749,594 B1 8/2020 O'Shea et al.  
2006/0019602 A1 1/2006 Ionescu et al.

2007/0049218 A1* 3/2007 Gorokhov ............ H04B 7/0689  
455/102  
2011/0051747 A1* 3/2011 Schmidl .............. H04W 56/001  
370/474  
2016/0182102 A1* 6/2016 Wang ................... H04B 1/0475  
375/296

(Continued)

FOREIGN PATENT DOCUMENTS

WO 2020/064093 A1 4/2020

OTHER PUBLICATIONS

B. Zhu et al., "Joint Transceiver Optimization for Wireless Communication PHY Using Neural Network," IEEE Journal on Selected Areas in Communications, Jun. 2019, vol. 37, No. 6, pp. 1364-1373.

(Continued)

*Primary Examiner* — Kevin M Burd  
(74) *Attorney, Agent, or Firm* — SQUIRE PATTON BOGGS (US) LLP

(57) ABSTRACT

An apparatus, method and computer program is described comprising: transmitting signals from a transmitter of a multiple-input single-output transmission system to a receiver of the transmission system, wherein the transmitter communicates with the receiver over a plurality of channels of the transmission system, wherein the transmitter includes a transmitter algorithm having at least some trainable weights, wherein said transmitter algorithm converts a sequence of coded bits into time domain baseband symbols for transmission over said channels; updating weights of said transmitter algorithm based on a loss function, said loss function having a first loss term, a second loss term and a variable defining a weighting of those loss terms, wherein the first parameter relates to an information rate of communications from the transmitter to the receiver; and repeating the transmitting and updating until a first condition is reached.

20 Claims, 9 Drawing Sheets

(56)                     References Cited

U.S. PATENT DOCUMENTS

| 2017/0366226 A1* | 12/2017 | Weissman | H04L 43/16 |
| 2020/0204421 A1* | 6/2020 | Levinbook | H04L 27/2607 |
| 2021/0126669 A1* | 4/2021 | Roberts | H04L 5/14 |
| 2021/0192320 A1* | 6/2021 | Hoydis | G06N 3/045 |
| 2023/0353208 A1* | 11/2023 | Katla | H04B 7/0695 |

OTHER PUBLICATIONS

Office Action dated Aug. 12, 2021 corresponding to Finnish Patent Application No. 20215104.
Communication of Acceptance—section 29a of Patents Decree dated Sep. 21, 2022 corresponding to Finnish Patent Application No. 20215104.

* cited by examiner

81 — Initialize the trainable parameters

82 — Sample bit vectors, channel realizations and estimates

83 — Run an inference through the end-to-end system

84 — Perform one step of SGD to update the trainable parameters

85 — Done?

No

Yes

Stop

80

100

TRANSMITTER

CROSS REFERENCE TO RELATED APPLICATION

This application corresponds to Finnish Application No. 20215104, filed on Feb. 1, 2021 and published on Aug. 2, 2022. Though no priority is claimed, the publication is not available as prior art against this document, under the exceptions of 35 USC § 102(b)(1) and (b)(2).

FIELD

The present specification relates to transmitters, for example to transmitters in Multiple Input Single Output (MISO) systems.

BACKGROUND

MISO systems comprising a transmitter and a receiver are known. Although options exist for training modules of such as a system, there remains a desire for further developments in this field.

SUMMARY

In a first aspect, this specification describes an apparatus comprising means for performing: transmitting signals from a transmitter of a multiple-input single-output transmission system to a receiver of the transmission system, wherein the transmitter communicates with the receiver over a plurality of channels of the transmission system, wherein the transmitter includes a transmitter algorithm having at least some trainable weights, wherein said transmitter algorithm converts a sequence of coded bits into time domain baseband symbols for transmission over said channels; updating at least some of the trainable weights of said transmitter algorithm based on a loss function, said loss function having a first loss term, a second loss term and a variable defining a weighting of those loss terms, wherein the first loss term relates to an information rate of communications from the transmitter to the receiver; and repeating the transmitting and updating until a first condition (e.g. a defined number of iterations or a defined performance level) is reached. The receiver may be a communication node of a mobile communication system. The trainable weights of the transmitter algorithm may enable the transmitter to be trained using machine learning principles (such that the transmitter algorithm is a machine learning algorithm).

The second loss term of the loss function may relate to an envelope of at least one of the time domain baseband symbols.

In some example embodiments, the receiver has a fixed receiver algorithm. In some other example embodiments, the receiver includes a receiver algorithm having at least some trainable weights. The trainable weights of the receiver algorithm may enable the received to be trained using machine learning principles (such that the receiver algorithm is a machine learning algorithm). In such embodiments, the apparatus may further comprise means configured to perform updating the weights of said receiver algorithm based on said loss function together with the weights of the transmitter algorithm.

Some example embodiments further comprise means for performing: pre-processing said sequence of coded bits using a pre-coder prior to application to said transmitter algorithm. Said pre-processing may be implemented using a pre-processor having fixed functionality.

Some example embodiments further comprise means for performing: oversampling said time domain baseband symbols for transmission over said channels, wherein said loss function is computed based on the oversampled time domain baseband symbols.

Some example embodiments further comprise means for performing: initialising said weights.

The transmitter algorithm may be implemented using one or more neural networks. Alternatively, or in addition, the receiver algorithm may be implemented using one or more neural networks.

In a second aspect, this specification describes a multiple-input single-output transmission system comprising a transmitter, a plurality of channels and a receiver, the transmission system comprising means for performing: transmitting signals from the transmitter to the receiver over the plurality of channels, wherein the transmitter includes a transmitter algorithm having at least some trainable weights, wherein said transmitter algorithm converts a sequence of coded bits into baseband symbols for transmission over said channels; receiving the transmitted signals at the receiver; updating weights of said transmitter algorithm based on a loss function, said loss function having a first loss term, a second loss term and a variable defining the weighting of those parameters; and repeating the transmitting, receiving and updating until a first condition (e.g. a defined number of iterations or a defined performance level) is reached. The trainable weights of the transmitter algorithm may enable the transmitter to be trained using machine learning principles (such that the transmitter algorithm is a machine learning algorithm).

The second loss term of the loss function may relate to an envelope of at least one of the time domain baseband symbols.

In some example embodiments, the receiver has a fixed receiver algorithm. In some other example embodiments, the receiver includes a receiver algorithm having at least some trainable weights. The trainable weights of the receiver algorithm may enable the received to be trained using machine learning principles (such that the receiver algorithm is a machine learning algorithm). In such embodiments, the apparatus may further comprise means configured to perform updating the weights of said receiver algorithm based on said loss function together with the weights of the transmitter algorithm.

Some example embodiments further comprise means for performing: pre-processing said sequence of coded bits using a pre-coder prior to application to said transmitter algorithm. Said pre-processing may be implemented using a pre-processor having fixed functionality.

Some example embodiments further comprise means for performing: oversampling said time domain baseband symbols for transmission over said channels, wherein said loss function is computed based on the oversampled time domain baseband symbols.

Some example embodiments further comprise means for performing: initialising said weights.

The transmitter algorithm may be implemented using one or more neural networks. Alternatively, or in addition, the receiver algorithm may be implemented using one or more neural networks.

In the first and second aspects described above, the said means may comprise: at least one processor; and at least one memory including computer program code, the at least one memory and the computer program configured, with the at least one processor, to cause the performance of the apparatus.

In a third aspect, this specification describes a method comprising: transmitting signals from a transmitter of a multiple-input single-output transmission system to a receiver of the transmission system, wherein the transmitter communicates with the receiver over a plurality of channels of the transmission system, wherein the transmitter includes a transmitter algorithm having at least some trainable weights, wherein said transmitter algorithm converts a sequence of coded bits into time domain baseband symbols for transmission over said channels; updating weights of said transmitter algorithm based on a loss function, said loss function having a first loss term, a second loss term and a variable defining a weighting of those loss terms, wherein the first parameter relates to an information rate of communications from the transmitter to the receiver; and repeating the transmitting and updating until a first condition (e.g. a defined number of iterations or a defined performance level) is reached.

In a fourth aspect, this specification describes a method comprising: transmitting signals from a transmitter of a multiple-input single-output transmission system to a receiver of the transmission system, wherein the transmitter communicates with the receiver over a plurality of channels of the transmission system, wherein the transmitter includes a transmitter algorithm having at least some trainable weights, wherein said transmitter algorithm converts a sequence of coded bits into baseband symbols for transmission over said channels; receiving the transmitted signals at the receiver; updating weights of said transmitter algorithm based on a loss function, said loss function having a first loss term, a second loss term and a variable defining the weighting of those parameters; and repeating the transmitting, receiving and updating until a first condition (e.g. a defined number of iterations or a defined performance level) is reached. The trainable weights of the transmitter algorithm may enable the transmitter to be trained using machine learning principles (such that the transmitter algorithm is a machine learning algorithm).

In the third or fourth aspects, the second loss term of the loss function may relate to an envelope of at least one of the time domain baseband symbols In some example embodiments, the receiver has a fixed receiver algorithm. In some other example embodiments, the receiver includes a receiver algorithm having at least some trainable weights. The trainable weights of the receiver algorithm may enable the received to be trained using machine learning principles (such that the receiver algorithm is a machine learning algorithm). In such embodiments, the method may further comprise updating the weights of said receiver algorithm based on said loss function together with the weights of the transmitter algorithm.

Some example embodiments further comprise pre-processing said sequence of coded bits using a pre-coder prior to application to said transmitter algorithm. Said pre-processing may be implemented using a pre-processor having fixed functionality.

Some example embodiments further comprise oversampling said time domain baseband symbols for transmission over said channels, wherein said loss function is computed based on the oversampled time domain baseband symbols.

Some example embodiments further comprise initialising said weights.

In a fifth aspect, this specification describes computer-readable instructions which, when executed by computing apparatus, cause the computing apparatus to perform (at least) any method as described with reference to the third or fourth aspects.

In a sixth aspect, this specification describes a computer-readable medium (such as a non-transitory computer-readable medium) comprising program instructions stored thereon for performing (at least) any method as described with reference to the third or fourth aspects.

In a seventh aspect, this specification describes an apparatus comprising: at least one processor; and at least one memory including computer program code which, when executed by the at least one processor, causes the apparatus to perform (at least) any method as described with reference to the third or fourth aspects.

In an eighth aspect, this specification describes a computer program comprising instructions for causing an apparatus to perform at least the following: transmit signals from a transmitter of a multiple-input single-output transmission system to a receiver of the transmission system, wherein the transmitter communicates with the receiver over a plurality of channels of the transmission system, wherein the transmitter includes a transmitter algorithm having at least some trainable weights, wherein said transmitter algorithm converts a sequence of coded bits into time domain baseband symbols for transmission over said channels; update weights of said transmitter algorithm based on a loss function, said loss function having a first loss term, a second loss term and a variable defining a weighting of those loss term, wherein the first parameter relates to an information rate of communications from the transmitter to the receiver; and repeat the transmitting and updating until a first condition is reached.

In a ninth aspect, this specification describes a computer program comprising instructions for causing an apparatus to perform at least the following: transmit signals from a transmitter of a multiple-input single-output transmission system to a receiver of the transmission system, wherein the transmitter communicates with the receiver over a plurality of channels of the transmission system, wherein the transmitter includes a transmitter algorithm having at least some trainable weights, wherein said transmitter algorithm converts a sequence of coded bits into baseband symbols for transmission over said channels; receiving the transmitted signals at the receiver; update weights of said transmitter algorithm based on a loss function, said loss function having a first loss term, a second loss term and a variable defining the weighting of those parameters; and repeat the transmitting, receiving and updating until a first condition (e.g. a defined number of iterations or a defined performance level) is reached.

In a tenth aspect, this specification describes: one or more antennae (or some other means) for transmitting signals from a transmitter of a multiple-input single-output transmission system to a receiver of the transmission system, wherein the transmitter communicates with the receiver over a plurality of channels of the transmission system, wherein the transmitter includes a transmitter algorithm having at least some trainable weights, wherein said transmitter algorithm converts a sequence of coded bits into time domain baseband symbols for transmission over said channels; a machine-learning module (or some other means) for updating at least some of the trainable weights of said transmitter algorithm based on a loss function, said loss function having a first loss term, a second loss term and a variable defining a weighting of those loss terms, wherein the first loss term relates to an information rate of communications from the transmitter to the receiver; and a control module (or some other means) for repeating the transmitting and updating until a first condition (e.g. a defined number of iterations) is reached.

In an eleventh aspect, this specification describes: one or more antenna (or some other means) for transmitting signals from the transmitter to the receiver over the plurality of channels, wherein the transmitter includes a transmitter algorithm having at least some trainable weights, wherein said transmitter algorithm converts a sequence of coded bits into baseband symbols for transmission over said channels; a receiver antenna (or some other means) for receiving the transmitted signals at the receiver; a machine-learning module (or some other means) for updating weights of said transmitter algorithm based on a loss function, said loss function having a first loss term, a second loss term and a variable defining the weighting of those parameters; and a control module (or some other means) for repeating the transmitting, receiving and updating until a first condition (e.g. a defined number of iterations) is reached.

BRIEF DESCRIPTION OF THE DRAWINGS

Example embodiments will now be described, by way of example only, with reference to the following schematic drawings, in which.

DETAILED DESCRIPTION

Figure 1:
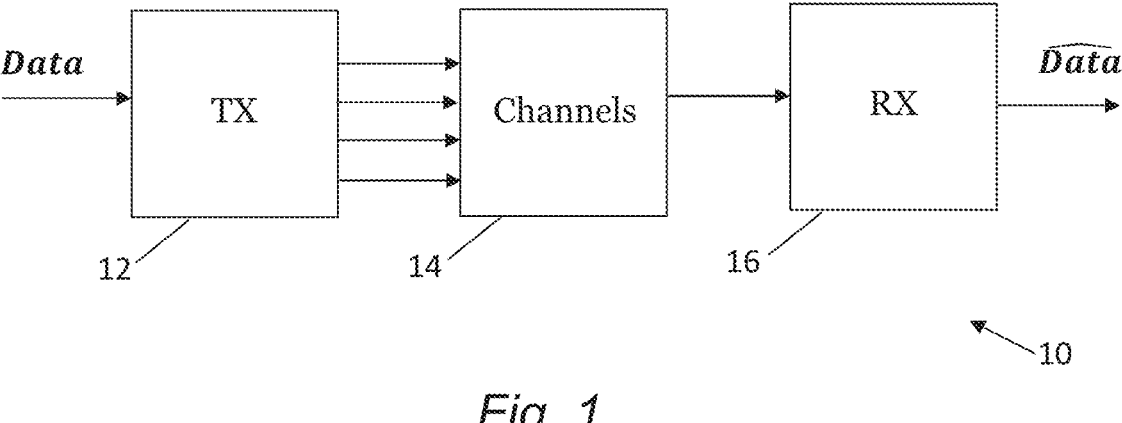
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. The system 10 may be a transmission system that forms part of a mobile communication system. The system 10 comprises a transmitter 12, a plurality of channels 14 and a receiver 16. The system 10 is Multiple Input Single Output (MISO) system in which the transmitter 12 communicates with the receiver 16 over a plurality of channels of the transmission system.

The transmitter 12 generates data for transmission to the receiver 16 by converting a sequence of coded bits (data) into time domain baseband symbols for transmission over the plurality of channels. The receiver 16 receives a signal based on the plurality of transmissions and seeks generate an estimate ($\widehat{data}$) of the original coded data.

The transmitter 12 includes a power amplifier for amplifying a signal to a high enough level for radio transmission. The transfer function of the power amplifier may be close to linear when operating at power levels below a saturation point. However, at levels higher than the saturation point, undesired non-linear distortions of the signal can occur. Such distortions can degrade communication performance and can lead to out-of-band radiation. One relevant variable is the peak-to-average power ratio (PAPR) that is defined as the ratio of the peak power to the average power of the relevant signal. To avoid distortion of the signal to be transmitted, one can operate the power amplifier at power levels far lower than the saturation point, leaving a headroom from the saturation point at least equal to the PAPR. However, operating the power amplifier with a large back off is power inefficient. Such an approach is therefore unattractive in many circumstances, especially as the power amplifier may be one of the most energy consuming components of the transmitter 12.

One technique to avoid or reduce distortions caused by the power amplifier of the transmitter 12 is digital predistortion (DPD), which consists of pre-distorting the signal prior to feeding it to the power amplifier in a way that reduces or minimizes the distortions introduced by the power amplifier. However, DPD often requires the use of complex, expensive, and power-consuming predistortion circuits. This can be a significant issue in systems with multiple transmit antennas (such as the system 10), as a DPD circuit may be required for each radio frequency chain. Moreover, DPD can generally only mitigate the distortion due to the power amplifier, but not completely cancel it.

Figure 2:
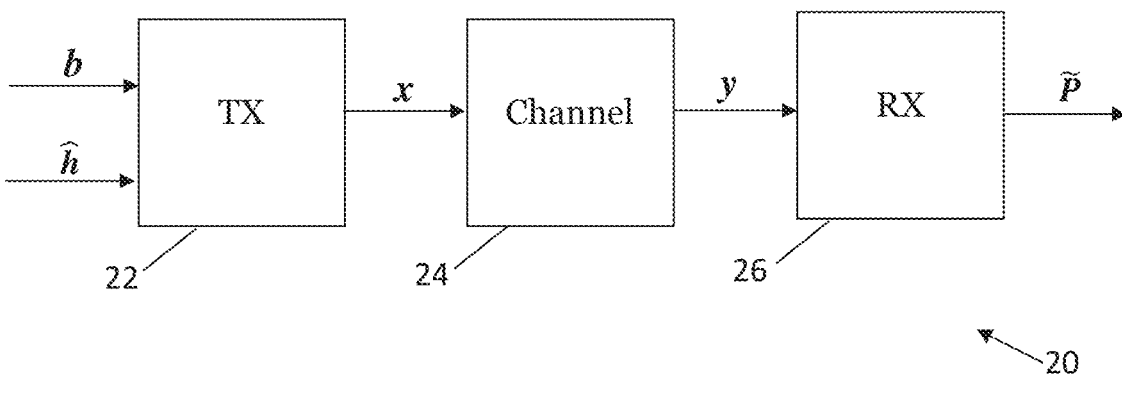
FIG. 2 is a block diagram of a system in accordance with an example embodiment.

FIG. 2 is a block diagram of a system, indicated generally by the reference numeral 20, in accordance with an example embodiment. The system 20 comprises a transmitter 22, a channel 24 and a receiver 26 that are similar to the transmitter 12, channels 14 and receiver 16 of the system 10 described above. The transmitter 22 may form part of a mobile communication system. The receiver 26 may be a communication node (e.g. a base station) of a mobile communication system. As described in detail below, the transmitter 22 includes a trainable transmitter algorithm that can learn a mapping between the coded bits for transmission and a signal with (close-to) constant envelope in the context of multiple-input single-output (MISO) systems. If the precoded signal has constant envelope, the PAPR is always close to 0 dB, which avoids power inefficiencies of the power amplifier and may reduce or remove the need for digital pre-distortion.

The trainable transmitter 22 (which may be implemented using one or more neural networks) takes as input coded bits b as well as an estimate of the channel response ĥ. The transmitter 22 outputs a matrix $x \in \mathbb{C}^{N \times M}$ corresponding to the baseband signal to be transmitted by the M antennas and over N channels.

The channel estimate ĥ could be obtained in many ways such as feedback from the receiver (e.g., quantized channel state information in form of codebook or grid-of-beams indices) or channel estimation at the transmitter based on pilots sent by the transmitter (in TDD systems only). Many alternative arrangements are possible.

The transmitter 22 may be trained to learn a transmitter function $f_\theta$ with trainable parameters $\theta$ that maps a sequence of coded bits $b \in \{0,1\}^K$ of size K and an estimate of the channel response $\hat{h}$ onto the matrix of time domain baseband symbols $x \in \mathbb{C}^{N \times M}$, where N is the signal length, i.e., the number of channel used. Each row of x corresponds to the symbols transmitted over the M antennas at a given time. The transmitter 22 can be optimized based on a loss function. For example, the transmitter 22 may be trained to maximize an information rate that is achievable by practical bit-interleaved coded modulation (BICM) systems and under one or more constraints (such as the constraint of generating a time domain signal with (close to) constant envelope).

The receiver 26 may take a number of different forms. For example, the receiver 26 could be a fixed receiver, or could itself be trainable.

For example, the receiver 26 could be a conventional receiver, such as a receiver that assumes an orthogonal frequency-division multiplexing (OFDM) waveform and quadrature amplitude modulation (QAM). In this case, the trainable transmitter 22 may be optimized to maximize the information rate under the constraint of generating a signal with constant envelope and staying compatible with the conventional receiver. With this approach, no modification of the detection algorithm implemented at the receiver (which may be a user terminal) is required.

Alternatively, a trainable detection algorithm may implemented at the receiver 26. In this case, the trainable receiver 26 may be jointly optimized with the trainable transmitter 22 to achieve the highest possible information rate, under one or more constraints (such as having a signal with constant envelope being transmitted). In such an arrangement, the trainable receiver may be implemented using one or more neural networks.

Figure 3:
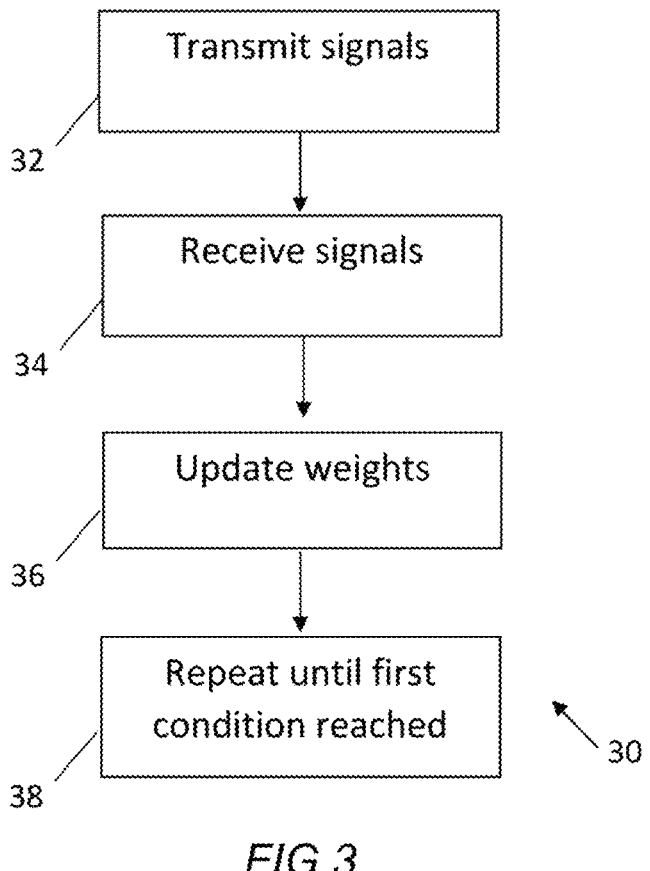
FIG. 3 is a flow chart showing an algorithm in accordance with an example embodiment.

FIG. 3 is a flow chart showing an algorithm, indicated generally by the reference numeral 30, in accordance with an example embodiment. The algorithm 30 may be implemented using a multiple-input single-output (MISO) transmission system comprising a transmitter, a plurality of channels and a receiver (such as the transmitter 22, channels 24 and receiver 26 described above).

The algorithm 30 starts at operation 32, where signals are transmitted from a transmitter of the multiple-input single-output (MISO) transmission system to a receiver of the transmission system. The transmitter (e.g. the transmitter 22) communicates with the receiver (e.g. the receiver 26) over a plurality of channels of the MISO transmission system. The transmitter includes a transmitter algorithm having at least some trainable weights (such that the transmitter algorithm can be trained using machine learning principles), wherein said transmitter algorithm converts a sequence of coded bits into time domain baseband symbols for transmission over said channels. The transmitter algorithm is therefore a machine learning algorithm.

At operation 34, the transmitter signals are received at the receiver of the MISO transmission system.

At operation 36, least some of the trainable weights of said transmitter algorithm are updated based on a loss function (i.e. by minimising the loss of the loss function). As described further below, the loss function may have a first loss term, a second loss term and a variable (e.g. a tuning parameter) defining a weighting of those loss terms. The first loss term may relate to an information rate of communications from the transmitter to the receiver. The second loss term of the loss function may relate to an envelope of at least one of the time domain baseband symbols. Other second loss terms are possible in addition to, or instead of, said envelop. Such loss terms include PAPR and out-of-band emissions (such as ACLR).

As indicated by the operation 38, the transmitting and updating (i.e. the operations 32 to 36) are repeated until a first condition is reached (i.e. until the algorithm is deemed to be complete, for example when a defined number of iterations have been completed or when a defined performance is reached).

Figure 4:
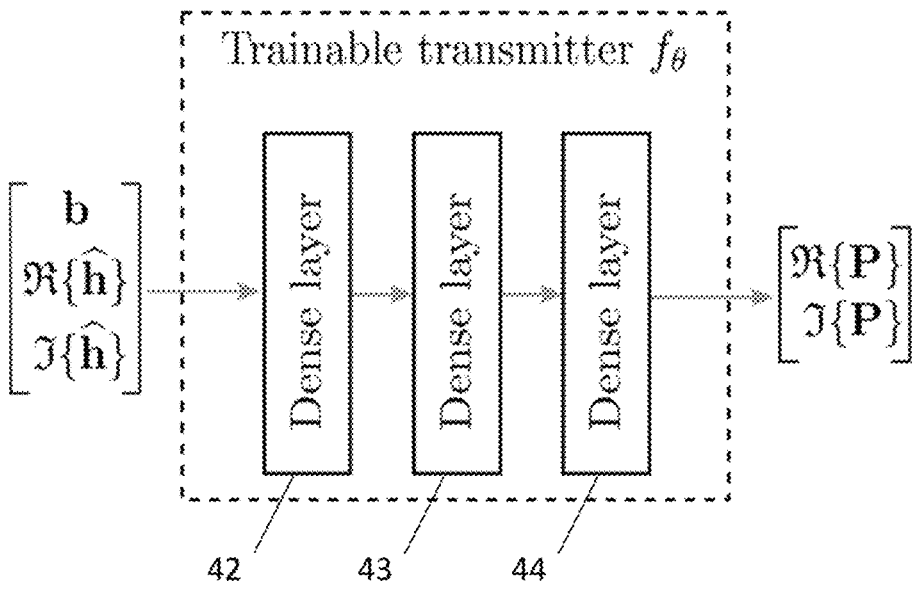
FIG. 4 is a block diagram of a transmitter in accordance with an example embodiment.

FIG. 4 is a block diagram of a transmitter, indicated generally by the reference numeral 40, in accordance with an example embodiment. The transmitter 40 is implemented by a neural network. It should be noted that the neural network architecture shown in FIG. 4 serves as an example; other architectures are possible, as will be apparent to those of ordinary skill in the art.

The transmitter 40 is an example implementation of the transmitter 22 described above. In a similar manner, the receiver 26 may be implemented using one or more neural networks.

The transmitter 40 is implemented by a neural network (NN), where the trainable parameters $\theta$ correspond to the weights of the neural network. The bits for transmission and the real and imaginary parts of the vector of channel coefficient estimates $\hat{h}$ are provided at the input of the neural network 40. In response, the neural network outputs real and imaginary parts of the time domain baseband signal x. In the example transmitter 40, the neural network is made of three dense layers (labelled 42 to 44 in FIG. 4). Of course, a different number of dense layers could be provided and many other architectures and configurations are possible.

Assuming a channel with L taps and denoting by $h_{n,m} \in \mathbb{C}^L$, $1 \leq n \leq N$, $1 \leq m \leq M$ the tap coefficients for the $n^{th}$ channel use and $m^{th}$ antenna, the received signal for the N channel uses $y \in \mathbb{C}^N$ is $$y_n = \sum_{m=1}^{M} \sum_{l=0}^{L-1} h_{n,m}[l] x[n-l, m] + w_n, \, 1 \leq n \leq N$$

where $w_n$ is the Gaussian additive noise, and the notation [•] is used to index vectors and matrices. The detection algorithm at the receiver computes posterior probabilities (or equivalently, log-likelihood ratios) on the coded bits conditioned on the received signal y, which are denoted by $\tilde{P}(b_k|y)$, $1 \leq k \leq K$.

Training of the end-to-end system is implemented using the regularized loss function:

$$\mathcal{L}(\theta) := \mathcal{J}(\theta) + \lambda C(\theta)$$

where $\mathcal{J}$ is the loss function, C the regularization that enforces the constraint of generating a signal with constant envelope, and $\lambda \in \mathbb{R}^+$ the regularization parameter.

The loss function $\mathcal{J}$ is the binary cross-entropy defined as:

$$\mathcal{J}(\theta) := \sum_{k=1}^{K} \mathbb{E}_{b_k, y}\left[-\log \tilde{P}(b_k \mid y)\right]$$

Optimizing on the binary cross-entropy $\mathcal{J}$ is equivalent to maximizing the rate:

$$R := \underbrace{\sum_{k=1}^{K} I(B_k, Y)}_{\substack{\text{Achievable rate} \\ \text{assuming a perfect} \\ \text{receiver}}} - \underbrace{\sum_{k=1}^{K} \mathbb{E}_y \left[ D_{KL} \left[ P(b_k \mid y) \middle\| \hat{P}(b_k \mid y) \right] \right]}_{\substack{\text{Rate loss due to} \\ \text{suboptimal receiver}}}$$

where $I(B_k, Y)$ is the mutual information between the $k^{th}$ transmitted bit and the received signal $Y$, $D_{KL}$ is the Kullback-Leibler (KL) divergence, and $P(b_k|y)$ the true posterior distribution on the bit $b_k$ conditioned on the received signal y. Note that R can be shown to be an achievable rate for practical BICM systems. The first term is an achievable rate assuming that an optimal receiver is used, i.e., one that computes the actual posterior distribution on the bits conditioned on the received signal. The second term is the rate loss due the use of a suboptimal receiver, which is typically the case as implementing the optimal receiver is usually infeasible due to the high complexity it would require or because of the lack of knowledge of the exact channel statistics.

Therefore, optimizing the trainable transmitter on the binary cross-entropy $\mathcal{J}$ is equivalent to maximizing an information rate achievable by practical BICM systems. If the receiver is also trainable, the receiver may be jointly optimized with the transmitter to reduce its KL divergence to the optimal detection algorithm.

The regularization C enforces the signal generated by the trainable transmitter to have constant envelope. One way to implement this regularization is by performing an s-fold oversampling of the generated signal x, e.g., using a zero-padded inverse fast Fourier transform, to obtain the oversampled signal $\bar{x}$. In some example embodiments, a 4-fold oversampling is needed to obtain a good representation of the signal's (time domain) amplitude. The regularization cost could then correspond to the variance of the oversampled signal $\bar{x}$, i.e., $$C(\theta) := \frac{1}{sNM} \sum_{i=1}^{sN} \sum_{j=1}^{M} \left( \|\bar{x}[i, j]\|^2 - p \right)^2$$

where p is a target power level, e.g., p=1.

It should be noted that it is possible to compute the regularization C based on the non-oversampled signal x. However, in some example embodiments, using an oversampled version of the signal better ensures the constant envelope constraint.

As discussed elsewhere, other regularization functions, enforcing other constraints than the one presented above, could be used. For example, one could use the PAPR of the generated signal x as a regularization constraint, or the adjacent channel leakage power ratio (ACLR). A combination of multiple constraints is also possible.

As noted above, the receiver 26 may take a number of different forms. For example, the receiver 26 could implement a fixed receiver algorithm, or could itself be trainable. An example of a system including a fixed receiver is discussed below with reference to FIG. 5. An example of a system including a trainable receiver is discussed below with reference to FIG. 6.

Figures 5, 6:
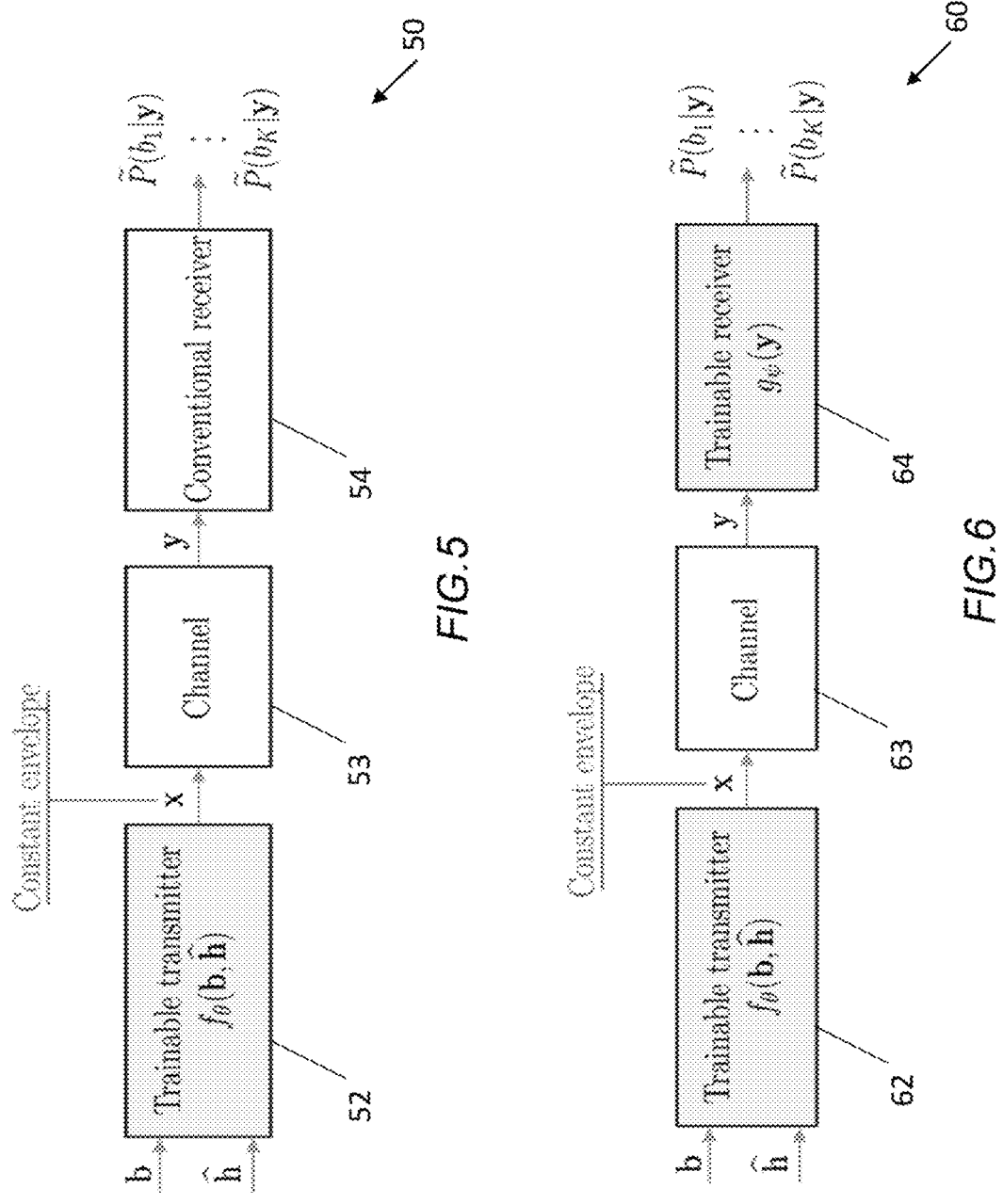
FIGS. 5 to 7 are block diagrams of systems in accordance with example embodiments.

FIG. 5 is a block diagram of a system, indicated generally by the reference numeral 50, in accordance with an example embodiment. The system 50 comprises a trainable transmitter 52, a channel 53 and a receiver 54. The system 50 is an example implementation of the system 20.

The receiver 54 implements a traditional detection algorithm, e.g., one that assumes an OFDM waveform and QAM modulation. By training the transmitter 52 on a loss computed from the output of a conventional receiver 54, the transmitter can be forced to stay compatible with the conventional detection scheme. This may avoid the need to modify the detection algorithm implemented at the receiver, which may, for example, be a user equipment.

FIG. 6 is a block diagram of a system, indicated generally by the reference numeral 60, in accordance with an example embodiment. The system 60 comprises a trainable transmitter 62, a channel 63 and a trainable receiver 64. The system 60 is an example implementation of the system 20.

The receiver 64 includes a receiver algorithm $g_\psi$ having at least some trainable parameters $\psi$. With this approach, the receiver is implemented (e.g. using a neural network), and jointly trained (e.g. using a loss function) with the transmitter in an end-to-end manner to seek to achieve the highest possible information rate under the sole constraint of transmitting a signal with constant envelope. Such an end-to-end system could become relevant for 6G networks.

Figure 7:
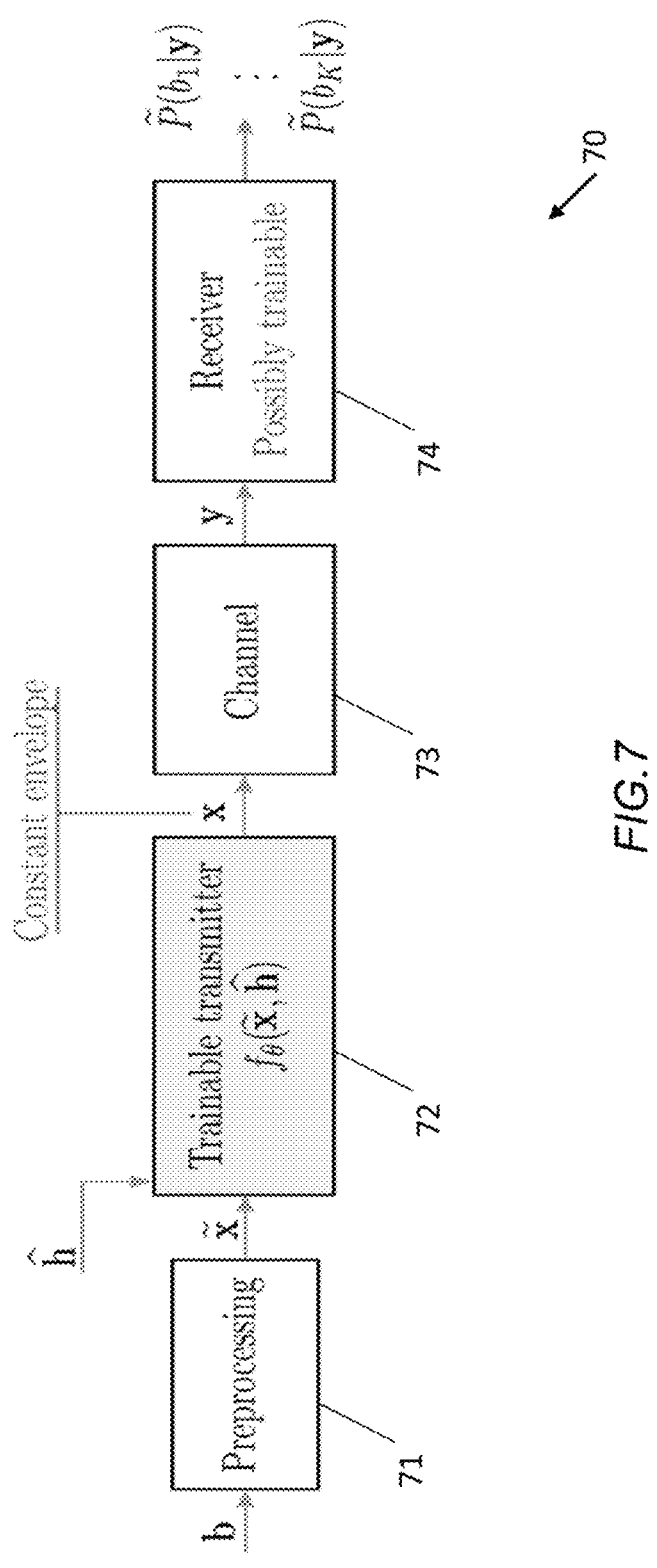

FIG. 7 is a block diagram of a system, indicated generally by the reference numeral 70, in accordance with an example embodiment. The system 70 comprises a pre-processor module 71, a trainable transmitter 72, a channel 73 and a receiver 74. The system 70 is an example implementation of the system 20. The transmitter 72 may similar to the transmitters 52 and 62 described above and the channel 73 may be similar to the channels 52 and 62 described above. The receiver 74 may be a fixed receiver (such as the receiver 54) or a trainable receiver (such as the receiver 64).

Thus, the transmitter 72 may be provided with preprocessed bits instead of raw data bits. For example, the coded bits b may be first be modulated using QAM and the so obtained signal would be fed to a trainable algorithm that would generate a constant envelope waveform. Other preprocessing steps are possible. For example, the raw bits could be mapped to OFDM symbols with or without cyclic prefix before being fed into the trainable transmitter.

Figure 8:
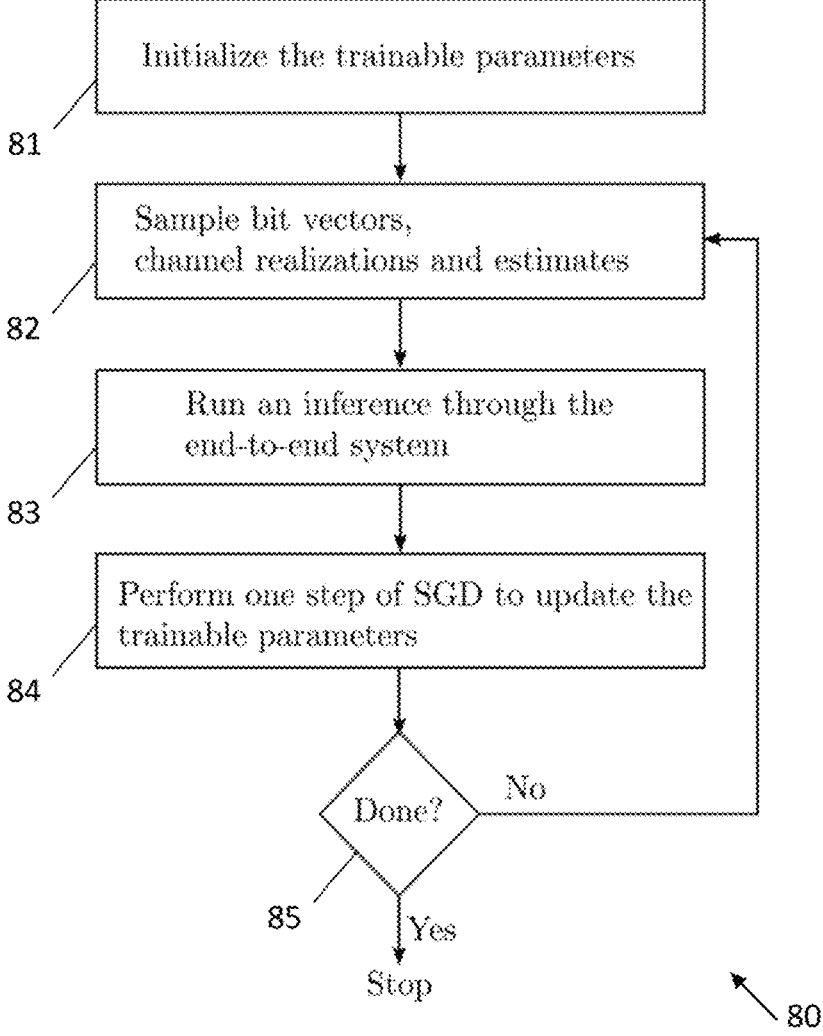
FIG. 8 is a flow chart showing an algorithm in accordance with an example embodiment.

FIG. 8 is a flow chart showing an algorithm, indicated generally by the reference numeral 80, in accordance with an example embodiment.

The algorithm 80 shows a training procedure that can be used to optimize a trainable transmitter (possibly jointly with the trainable receiver), in an end-to-end manner. The algorithm 80 assumes that the receiver and channel model are differentiable with respect to their inputs. Note that a trainable receiver implemented by a neural network is differentiable. In addition, the channel transfer function discussed above is differentiable. (If the channel model, detection algorithm at the receiver, or regularization is not differentiable, alternatives training algorithms exist, such as training the end-to-end system using a perturbative approach inspired by reinforcement learning.)

Assuming a dataset of channel realizations is available as well corresponding channel estimates $\hat{h}$, the algorithm 80 may proceed as follows.

At operation 81, the trainable transmitter parameters $\theta$ (and possibly also the trainable receiver parameters $\psi$) are initialised. The initialisation may be random, but alternative are possible (such as pseudo-random initialisation, or initialisation or a predefined starting point).

At operation 82, B examples of channel realizations are sampled together with their corresponding channel estimates $\hat{h}^{(b)}$, as well as bit vectors $b^{(b)} \in \{0,1\}^K$, $1 \leq b \leq B$.

An inference is run through the end-to-end system in operation 83, in order to compute the channel outputs $y^{(b)}$ and the posterior probabilities on bits $$\hat{P}\left(b_k^{(b)}\big|y^{(b)}\right),\ 1 \le b \le B.$$

At operation 84, one step of stochastic gradient descent (SGD) is applied to update the weights $\theta$ (and possibly $\psi$) on the Monte Carlo estimate of $\mathcal{J}$ $$\mathcal{J}(\theta) \approx -\frac{1}{B}\sum_{b=1}^{B}\sum_{k=1}^{K} b_k^{(b)}\log\hat{P}\left(b_k^{(b)}\,\big|\,y^{(b)}\right) + \lambda\frac{1}{sNMB}\sum_{b=1}^{B}\sum_{i=1}^{sN}\sum_{j=1}^{M}\left(\left|\overline{P}^{(b)}[i,\,j]\right|^2 p\right)^2$$

At operation 85, a determination is made regarding whether the algorithm 80 is complete. If so, the algorithm terminates. Otherwise, the algorithm returns to operation 82. The operation 85 may include a stop criterion such as a predefined number of iterations or when the loss function has not decreased for a predefined number of iterations.

The learning rate, batch size B, $\lambda$, and possibly other parameters of the SGD variant (Adam, RMSProp . . . ) may be optimization hyperparameters.

The NNs implementing the transmitter and the receiver could take additional inputs. For instance, the NN implementing the receiver could take as input the channel estimate.

Figure 9:
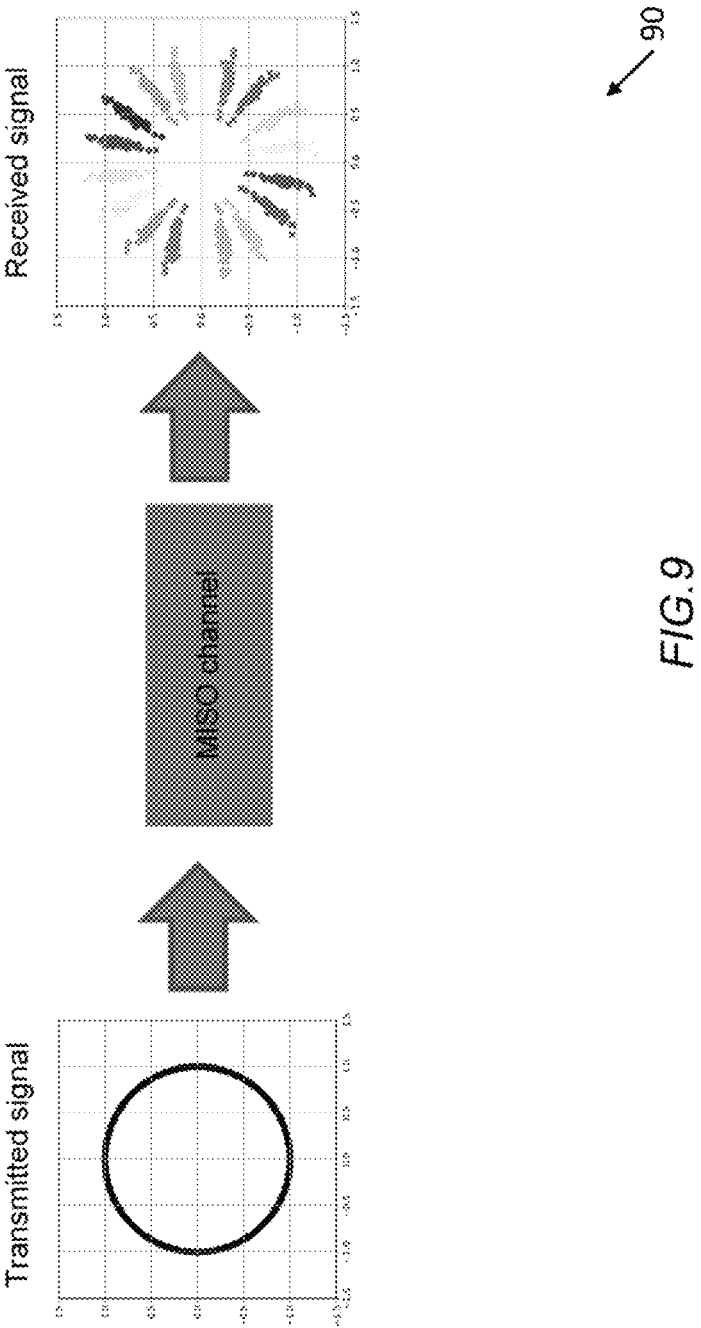
FIGS. 9 and 10 shows plots of results of simulations of example embodiments.
Figure 10:
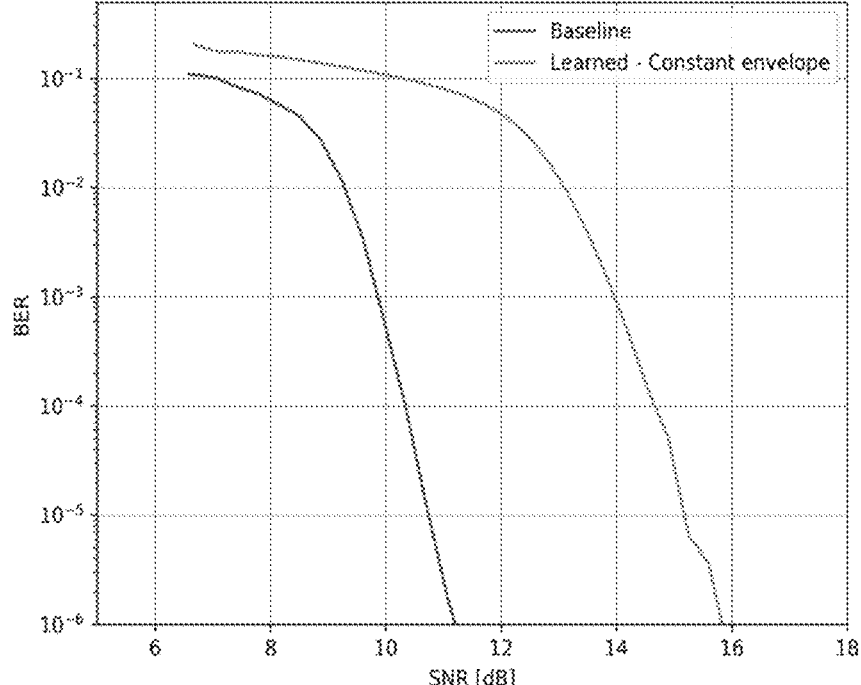

FIGS. 9 and 10 shows plots of results of simulations, indicated generally by the reference numerals 90 and 100 respectively, of example embodiments.

Experimentations were performed considering a flat-fading Rayleigh channel, with M=16 antennas and K=4 bits. Both the transmitter and receiver were implemented by neural networks. The neural network implementing the transmitter was made of three dense layers, as discussed with reference to FIG. 4. The neural network implementing the receiver had a similar architecture, with only different inputs and outputs. Both the transmitter and receiver were fed with channel estimates.

FIG. 9 shows the (IQ-) constellation diagrams of the transmitted and the received signals. The transmitted signals included the constant envelope constraint discussed above. Because of the constant envelope constraint, the transmitted signal x lies on the unit circle. However, the received signal y is clearly separable into different clusters (16 clusters, as K=4), despite the channel effect. Note that the signal depicted in the right-hand figure is the raw received signal y without any processing. This result shows the ability of the trainable transmitter to exploit the spatial diversity in order to create a signal separable at the receiver despite the constant envelope constraint.

The bit error rate (BER) achieved by the proposed scheme was compared to a baseline leveraging 16-QAM and maximum-ratio transmission. A 5G standard code with a length of 1024 bits and a code rate of ⅔ was leveraged. Results are shown in FIG. 10. One can see that the proposed scheme requires 4 dB more power to achieve similar BER of $10^{-3}$. However, the baseline has a PAPR of 10 dB while the solution described herein has a PAPR at or close to 0 dB. Since transmitting a constant envelope signal is much more energy efficient than transmitting signals with high PAPR, the loss in spectral efficiency could be compensated for by a higher power amplifier output power which is not accounted for in these simulations.

Figure 11:
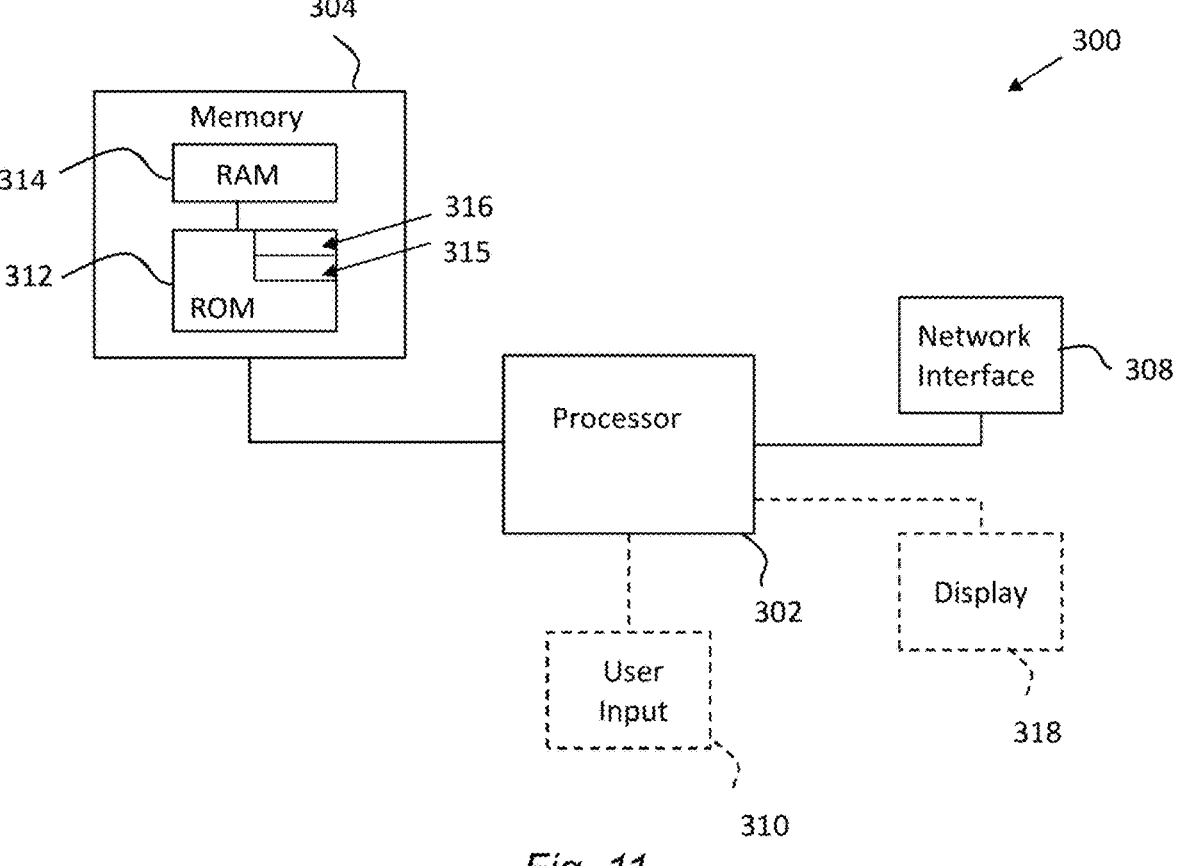
FIG. 11 is a block diagram of components of a system in accordance with an example embodiment.

For completeness, FIG. 11 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 30 and 80 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figures 12A, 12B:
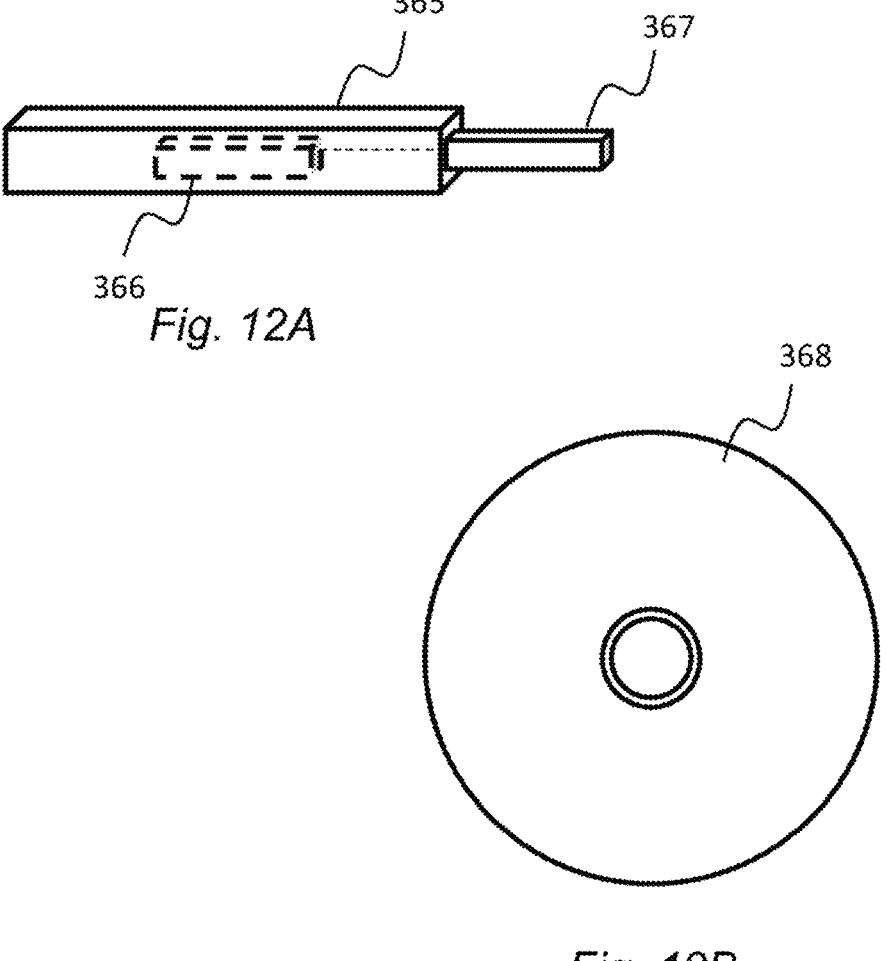
FIGS. 12A and 12B show tangible media, respectively a removable non-volatile memory unit and a compact disc (CD) storing computer-readable code which when run by a computer perform operations according to example embodiment.

FIGS. 12A and 12B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 3 and 8 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:

at least one processor; and at least one memory storing instructions that, when executed by the at least one processor, cause the apparatus to perform:

transmitting signals from a transmitter of a multiple-input single-output transmission system to a receiver of the transmission system, wherein the transmitter communicates with the receiver over a plurality of channels of the transmission system, wherein the transmitter includes a transmitter algorithm having at least some trainable weights, wherein said transmitter algorithm converts a sequence of coded bits into time domain baseband symbols for transmission over said channels;

updating at least some of the trainable weights of said transmitter algorithm based on a loss function, said loss function having a first loss term, a second loss term and a variable defining a weighting of those loss terms, wherein the first loss term relates to an information rate of communications from the transmitter to the receiver and the second loss term of the loss function enforces a constraint of generating a constant envelope of at least one signal comprising at least one of the time domain baseband symbols by performing an s-fold oversampling of the at least one signal; and repeating the transmitting and updating until a first condition is reached.

2. The apparatus as claimed in claim 1, wherein the receiver has a fixed receiver algorithm.

3. The apparatus as claimed in claim 1, wherein the receiver includes a receiver algorithm having at least some trainable weights.

4. The apparatus as claimed in claim 3, wherein the at least one memory and instructions, with the at least one processor, cause the apparatus to update the weights of said receiver algorithm based on said loss function together with the weights of the transmitter algorithm.

5. The apparatus as claimed in claim 3, wherein said receiver algorithm is implemented using one or more neural networks.

6. The apparatus as claimed in claim 1, wherein the at least one memory and instructions, with the at least one processor, cause the apparatus to perform:

pre-processing said sequence of coded bits using a precoder prior to application to said transmitter algorithm.

7. The apparatus as claimed in claim 1, wherein the at least one memory and instructions, with the at least one processor, cause the apparatus to perform: oversampling said time domain baseband symbols for transmission over said channels, wherein said loss function is computed based on the oversampled time domain baseband symbols.

8. The apparatus as claimed in claim 1, wherein the first condition comprises a defined number of iterations.

9. The apparatus as claimed in claim 1, wherein the at least one memory and instructions, with the at least one processor, cause the apparatus to initialize said weights.

10. The apparatus as claimed in claim 1, wherein the receiver comprises a communication node of a mobile communication system.

11. The apparatus as claimed in claim 1, wherein said transmitter algorithm is implemented using one or more neural networks.

12. A multiple-input single-output transmission system, comprising:

a transmitter;

a plurality of channels; and a receiver, wherein the transmission system is configured to perform:

transmitting signals from the transmitter to the receiver over the plurality of channels, wherein the transmitter includes a transmitter algorithm having at least some trainable weights, wherein said transmitter algorithm converts a sequence of coded bits into baseband symbols for transmission over said channels;

receiving the transmitted signals at the receiver;

updating weights of said transmitter algorithm based on a loss function, said loss function having a first loss term, a second loss term and a variable defining the weighting of those parameters, wherein the first loss term relates to an information rate of communications from the transmitter to the receiver and the second loss term of the loss function enforces a constraint of generating a constant envelope of at least one signal comprising at least one of the time domain baseband symbols by performing an s-fold oversampling of the at least one signal; and repeating the transmitting, receiving and updating until a first condition is reached.

13. The multiple-input single-output transmission system as claimed in claim 12, wherein the receiver has a fixed receiver algorithm.

14. The multiple-input single-output transmission system as claimed in claim 12, wherein the receiver includes a receiver algorithm having at least some trainable weights.

15. The multiple-input single-output transmission system as claimed in claim 14, further comprising updating the weights of said receiver algorithm based on said loss function together with the weights of the transmitter algorithm.

16. A method, comprising:

transmitting signals from a transmitter of a multiple-input single-output transmission system to a receiver of the transmission system, wherein the transmitter communicates with the receiver over a plurality of channels of the transmission system, wherein the transmitter includes a transmitter algorithm having at least some trainable weights, wherein said transmitter algorithm converts a sequence of coded bits into time domain baseband symbols for transmission over said channels;

updating weights of said transmitter algorithm based on a loss function, said loss function having a first loss term, a second loss term and a variable defining a weighting of those loss terms, wherein the first loss term relates to an information rate of communications from the transmitter to the receiver and the second loss term of the loss function enforces a constraint of generating a constant envelope of at least one signal comprising at least one of the time domain baseband symbols by performing an s-fold oversampling of the at least one signal; and repeating the transmitting and updating until a first condition is reached.

17. The method as claimed in claim 16, further comprising pre-processing said sequence of coded bits using a pre-coder prior to application to said transmitter algorithm.

18. The method as claimed in claim 16, further comprising oversampling said time domain baseband symbols for transmission over said channels, wherein said loss function is computed based on the oversampled time domain baseband symbols.

19. The method as claimed in claim 16, wherein the first condition comprises a defined number of iterations.

20. A non-transitory computer-readable medium comprising computer-readable instructions encoded thereon that, when executed by an apparatus, cause the apparatus to:

transmit signals from a transmitter of a multiple-input single-output transmission system to a receiver of the transmission system, wherein the transmitter communicates with the receiver over a plurality of channels of the transmission system, wherein the transmitter includes a transmitter algorithm having at least some trainable weights, wherein said transmitter algorithm converts a sequence of coded bits into time domain baseband symbols for transmission over said channels;

update weights of said transmitter algorithm based on a loss function, said loss function having a first loss term, a second loss term and a variable defining a weighting of those loss term, wherein the first loss term relates to an information rate of communications from the transmitter to the receiver and the second loss term of the loss function enforces a constraint of generating a constant envelope of at least one signal comprising at least one of the time domain baseband symbols by performing an s-fold oversampling of the at least one signal; and repeat the transmitting and updating until a first condition is reached.

* * * * *